July 2, 1963   J. J. KOLTHOF ET AL   3,096,166
APPARATUS FOR DEGASIFYING WATER, PARTICULARLY BOILER FEED WATER
Filed July 7, 1961

INVENTORS
JACOB J. KOLTHOF
MATTHEUS BESIER

United States Patent Office 3,096,166
Patented July 2, 1963

3,096,166
APPARATUS FOR DEGASIFYING WATER, PARTICULARLY BOILER FEED WATER
Jacob J. Kolthof and Mattheus Besier, Hengelo, Netherlands, assignors to Koninklijke Machinefabriek Gebr. Stork & Co. N.V., Hengelo, Netherlands
Filed July 7, 1961, Ser. No. 122,560
Claims priority, application Netherlands Aug. 10, 1960
3 Claims. (Cl. 55—198)

The invention relates to an apparatus for degasifying or deaerating water, particularly boiler feed water and consisting of a horizontally disposed vessel, in which near one of its ends a spraying device for supplying the water to be degasified is arranged above the water level and discharges the water in the form of a screen, one or more outlets being provided above the screen and a conduit for heating steam being located below the water level, said vessel having in its lower part an outlet for the degasified water. An apparatus of this kind is known from British Patent 721,037.

The present invention has for its object to improve the efficiency of an apparatus of the kind referred to. To this end according to the invention a casing is provided in the bottom part of the vessel, said casing being open at its one end and being closed at its other end beyond the outlet for the degasified water and a pipe for supplying hot condensate extending in said casing, a tube being connected to the top wall of the casing and opens above the water level in the vessel. With said embodiment of the apparatus the tube connected to the casing at the bottom of the vessel will exert a suction in the casing, whereby water from the vessel is drawn into the casing and is mixed with the hot condensate flowing out of the pipe into the casing, so that the water leaves the apparatus with a higher temperature. Moreover the water is still further degasified in the casing on the rather long way covered by the water in said casing and by the additional heating to which the water is subjected in the casing. Preferably an upright partition is connected at the inner side to the top wall of the casing beyond the connection of the tube opening above the water level in the vessel, said partition leaving a passage for the water at the bottom wall of the vessel. With said arrangement all gases driven out of the water in the casing are compelled to ascend into said tube.

The invention will be further described with reference to the accompanying drawing illustrating an embodiment of the apparatus according to the invention and in which—

Figure 1:
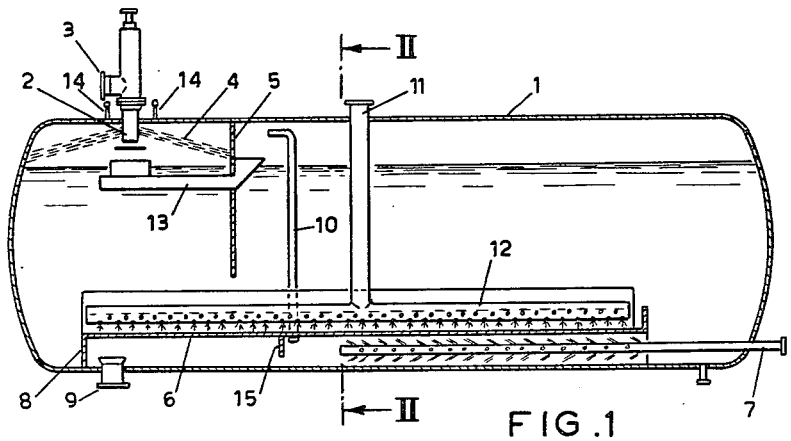
Figure 2:
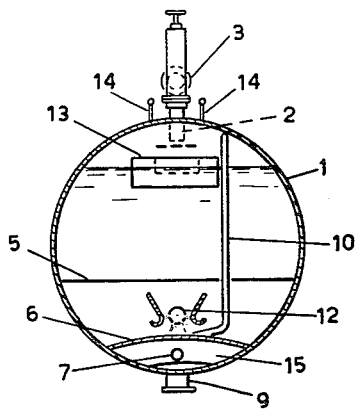

FIG. 1 shows a longitudinal sectional view of the vessel.
FIG. 2 is a cross sectional view taken along line II—II of FIG. 1.

In the top of the vessel 1 at one of its ends a cylindrical spraying device 2 is disposed to which the boiler feed water to be degasified is supplied at 3 in order to be sprayed into the vessel in the form of a conical screen 4. The compartment, in which the water screen 4 is formed, is separated from the remaining part of the vessel by an upright partition 5 extending below the water level as shown in British Patent 724,840.

In the lower part of the vessel a casing is formed by a plate 6 connected to the circumferential wall of the vessel, said casing being open at its end, where a pipe 7 enters the casing and being closed at its other end 8 near the outlet 9 for the degasified water. The pipe 7 has apertures in its wall, which preferably are inclined, so that the hot condensate introduced into said pipe is discharged according to the jets shown in FIG. 1. A tube 10 is connected to the wall 6 of the casing and opens above the water level.

The heating steam is introduced into the vessel by a conduit 11 to which a distributing pipe 12 is connected, which is provided with outlet openings in the lower half of its circumferential wall. The steam discharged by said openings heats the water contained in said vessel, so that the apparatus not only operates as a degasifier but also as a preheater.

The compartments formed by the partition 5 are in communication with each other by a pipe 13 opening at its both ends above the water level in the vessel and at one of said ends below the spraying device 2, so that steam and gases rising out of the water at the right hand side of the partition 5 flow through pipe 13 and are also discharged below the water screen 4 in order to ascend through the screen towards the outlets 14. Just beyond the tube 10 the casing is provided with a partition 15 leaving a passage for the water in the casing.

Condensate from a preheater, an air heater operating with steam or of a steam converter or the like may be supplied to pipe 7. Said condensate is mixed in the casing with the already degasified water entering the casing from the vessel and the mixture leaves the casing through the outlet 9. As the steam pipe 12 has discharged openings only at its lower half the casing is well heated. The remaining gases driven out in the casing and steam bubbles ascend through tube 10, whereby the degassing of the water is still furthered.

What we claim is:
1. An apparatus for degasifying water, comprising a horizontally disposed vessel adapted to contain water maintained to a normal level above its center, a spray device for discharging a water screen spray to be degasified arranged in said vessel near one end and in the upper part of the vessel above said normal water level, at least one outlet provided in said vessel above the screen of water emitted by said spray device, a conduit for introduction of heating steam located in the lower part of the vessel below said normal water level, an outlet for the degasified water at the bottom of the vessel, a casing provided in the bottom part of the vessel over said outlet, said casing having a top wall and being open at one end and closed at the other end beyond said outlet, a pipe for supplying hot condensate extending into said casing, and an upstanding tube connected to said top wall for venting gas from within the casing, said tube having its upper end opening in the upper part of the vessel above said normal water level.

2. An apparatus as claimed in claim 1 wherein is additionally provided a partition connected to and dependent from the underside of said casing top wall between said upstanding tube and said outlet for degasified water, said partition extending only part way toward the bottom of the vessel and leaving a passage for the water to said outlet.

3. An apparatus as claimed in claim 1 wherein said conduit for the heating steam has a lower portion closely adjacent said casing and has steam outlet openings only in said lower portion.

References Cited in the file of this patent

UNITED STATES PATENTS

| 2,685,938 | Walker et al. | Aug. 10, 1954 |
| 2,748,884 | Erwin | June 5, 1956 |
| 2,872,999 | Spining | Feb. 10, 1959 |

FOREIGN PATENTS

| 721,037 | Great Britain | Dec. 29, 1954 |
| 724,840 | Great Britain | Feb. 23, 1955 |
| 756,820 | Great Britain | Sept. 12, 1956 |